United States Patent
Lee et al.

(10) Patent No.: US 6,909,579 B2
(45) Date of Patent: Jun. 21, 2005

(54) MAGNETIC HEAD WITH A VERTICALLY LAMINATED BACK GAP STRUCTURE HAVING MAGNETIC LAYER THICKNESSES LESS THAN THE SKIN DEPTH

(75) Inventors: Edward Hin Pong Lee, San Jose, CA (US); Jeffrey Gregory McCord, San Jose, CA (US); Vladimir Nikitin, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 213 days.

(21) Appl. No.: 10/266,471

(22) Filed: Oct. 8, 2002

(65) Prior Publication Data

US 2004/0066576 A1 Apr. 8, 2004

(51) Int. Cl.[7] ............................................. G11B 5/147
(52) U.S. Cl. ..................................... 360/126; 29/603.15
(58) Field of Search ............... 360/126; 29/603.1–603.2

(56) References Cited

U.S. PATENT DOCUMENTS

| | | | | |
|---|---|---|---|---|
| 3,829,896 A | * | 8/1974 | Brock et al. ................. | 360/125 |
| 5,314,596 A | * | 5/1994 | Shukovsky et al. ......... | 204/192.2 |
| 6,195,229 B1 | | 2/2001 | Shen et al. | |

* cited by examiner

Primary Examiner—A. J. Heinz
(74) Attorney, Agent, or Firm—John J. Oskorep, Esq.

(57) ABSTRACT

A magnetic write head having a vertically laminated back gap structure and method of making the same are disclosed. The magnetic head is formed with lower and upper pole pieces and a back gap structure which connects the lower and the upper pole pieces in a back gap region. In one illustrative example, the back gap is a vertically laminated structure having alternating layers of magnetic and non-magnetic materials. Each alternating layer is perpendicular to both the lower and the upper pole pieces. This vertically laminated structure significantly reduces the eddy currents in the back gap region at high operating frequencies as the layers are oriented in a direction parallel with the magnetic flux.

36 Claims, 10 Drawing Sheets

MAGNETIC HEAD WITH A VERTICALLY LAMINATED BACK GAP STRUCTURE HAVING MAGNETIC LAYER THICKNESSES LESS THAN THE SKIN DEPTH

BACKGROUND OF THE INVENTION

1. Field of the Invention

This invention relates generally to magnetic heads and methods of making the same, and more particularly to magnetic write heads having vertically laminated back gap structures and methods of making such heads.

2. Description of the Related Art

A write head is typically combined with a magnetoresistive (MR) or giant magnetoresistive (GMR) read head to form a merged head. In one conventional design, the write head is made of first and second pole pieces having first and second pole tips, respectively, which terminate at an air bearing surface (ABS). The first and second pole pieces are connected at the back gap, whereas the first and second pole tips are separated by a non-magnetic gap layer. An insulation stack, which comprises a plurality of insulation layers, is sandwiched between the first and second pole pieces and a coil layer is embedded in this insulation stack. A processing circuit is connected to the coil layer for conducting write current through the coil layer which, in turn, induces write fields in the first and second pole pieces. Thus, write fields of the first and second pole tips at the ABS fringe across the gap layer. In a magnetic disk drive, a magnetic disk is rotated adjacent to, and a short distance (fly height) from, the ABS so that the write fields magnetize the disk along circular tracks. The written circular tracks then contain information in the form of magnetized segments with fields detectable by the read head.

One or more merged heads may be employed in a magnetic disk drive for reading and writing information on circular tracks of a rotating disk. A merged head is mounted on a slider that is carried on a suspension. The suspension is mounted to an actuator which rotates the magnetic head to locations corresponding to desired tracks. As the disk rotates, an air layer (an "air bearing") is generated between the rotating disk and an air bearing surface (ABS) of the slider. A force of the air bearing against the air bearing surface is opposed by an opposite loading force of the suspension, causing the magnetic head to be suspended a slight distance (flying height) from the surface of the disk.

Improved techniques for making magnetic heads have become increasingly important for proper head performance and fabrication. Magnetic head assemblies are typically made of multiple thin film layers which are patterned to form various shaped layers in the head. Some of the layers are electroplated, while other layers are sputter deposited over a wafer substrate.

The conventional method of forming a yoke of a magnetic head involves an electroplating deposition process. Deposition by electroplating, however, limits the choice of materials that can be used for the yoke. For high data rate applications (e.g., operating frequencies greater than 100 MHz), the yoke is preferably a laminated structure having alternating layers of magnetic and non-magnetic materials. This structure helps suppress eddy currents at high operating frequencies which desirably increases the efficiency of the magnetic head. The laminated structure may be deposited using dry process techniques, such as sputter deposition, followed by an ion milling process to pattern the yoke shape.

FIG. 1 is a cross-sectional view of a prior art magnetic head 111 which includes laminated structures to reduce the eddy currents at high operating frequencies. FIG. 2 shows part of the same magnetic head in a top down view. A magnetic portion 150 of the write head includes a first pole piece (P1) 112, a second pole piece (P2) 114, a third pole piece (P3) 126, and a back gap structure 134. First pole piece 112 includes a first pole piece layer 116 and a first pole tip structure 118 formed on top of first pole piece layer 116. First pole piece layer 116 is a horizontally laminated structure having alternating layers of magnetic and non-magnetic materials, as indicated by the horizontal lines within the structure. First pole tip structure 118, which is an electroplated pedestal, is separated from the pole tip of second pole piece 114 by a gap layer 120. Gap layer 120 may be made of alumina ($Al_2O_3$) or other suitable non-magnetic material.

Third pole piece 126 is formed partially over second pole piece 114 near the ABS and over back gap structure 134 in the back gap region. Like first pole piece layer 116, third pole piece 126 is a horizontally laminated structure having alternating layers of magnetic and non-magnetic materials, as indicated by the horizontal lines within the structure. Back gap structure 134 is formed between first and third pole pieces 112 and 126 to magnetically couple first, second, and third pole pieces 112, 114, and 126. Back gap structure 134 is an electroplated structure made of a magnetic material.

Conventional write coils 160 are also formed within the magnetic head over an insulator which is on top of first pole piece layer 116. In addition, a read sensor 128 (e.g., a GMR sensor) is sandwiched in between first and second shield layers 124 and 132. A separation layer 122, which is a non-magnetic material, separates second shield layer 124 from first pole piece 112.

As described earlier, the laminated structures having alternating layers of magnetic and non-magnetic materials in first and third pole pieces 116 and 126 help suppress the eddy currents and improve the high frequency performance of the write head. A loss of efficiency is still observed, however, in back gap structure 134 which is not a laminated structure. If back gap structure 134 were a horizontally laminated structure like first and third pole pieces 116 and 126, the eddy currents in the back gap region would still not be reduced significantly. This is because the lamination in first and third pole pieces 116 and 126 is oriented in the same direction as (i.e. parallel with) the magnetic flux, which breaks up the eddy current, whereas the same horizontal lamination in back gap structure 134 would be oriented in a direction perpendicular to the magnetic flux.

Accordingly, there is a resulting need for magnetic heads having back gap structures which suppress eddy currents at high operating frequencies, as well as methods of making the same.

SUMMARY OF THE INVENTION

A magnetic write head having a vertically laminated back gap structure and methods of making the same are disclosed. The magnetic head has lower and upper pole pieces and a back gap structure which connects the lower and the upper pole pieces in a back gap region. In one illustrative embodiment, the back gap structure is a vertically laminated structure having alternating layers of magnetic and non-magnetic materials. Each layer is perpendicular to both the lower and the upper pole pieces, and may be either perpendicular or parallel to the ABS plane. Advantageously, the vertically laminated structure reduces eddy currents in the back gap region at high operating frequencies. Alternatively, the back gap structure may be formed with magnetic columns interspersed within non-magnetic materials, where each column is perpendicular to both the lower and the upper pole pieces.

Methods for making such a magnetic head are also described. The method generally involves forming lower and upper pole pieces and a back gap structure which connects the lower and the upper pole pieces in a back gap region. In one illustrative embodiment, the method involves forming the back gap as a vertically laminated structure having alternating layers of magnetic and non-magnetic materials, so that each layer is perpendicular to both the lower and the upper pole pieces. Each layer may be either perpendicular or parallel to the ABS plane. Alternatively, the back gap structure is formed with magnetic columns interspersed within non-magnetic materials, where each column is perpendicular to both the lower and the upper pole pieces.

DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
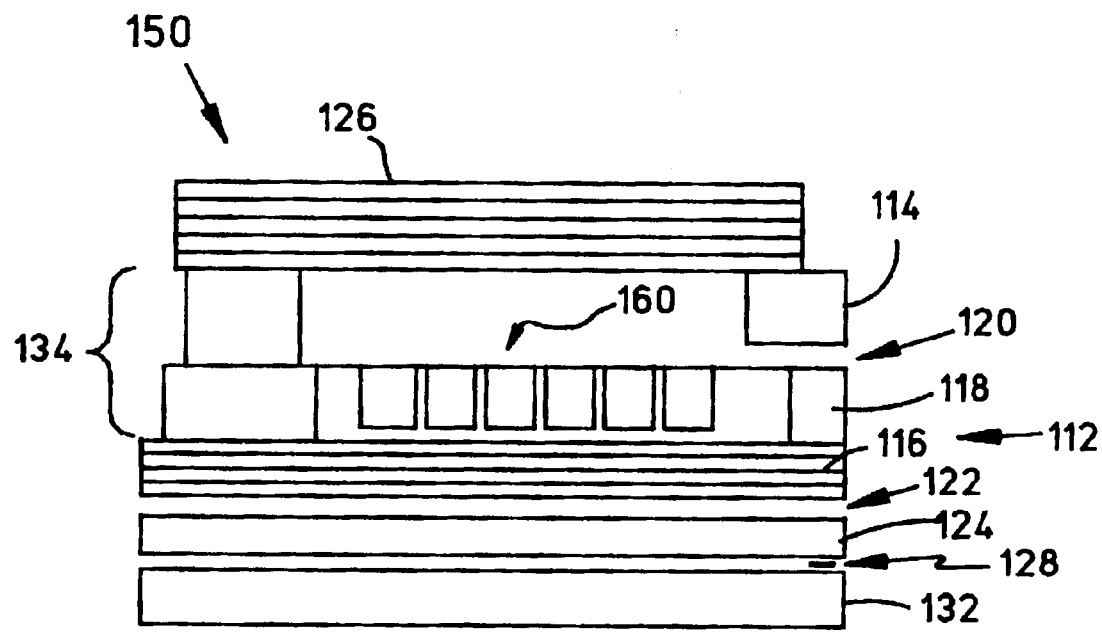
FIG. 1 is a cross-sectional view of a prior art magnetic head.
Figure 2:
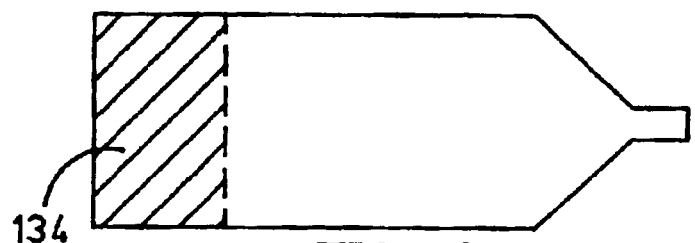
FIG. 2 is a top view of the prior art magnetic head of FIG. 1.
Figure 3:
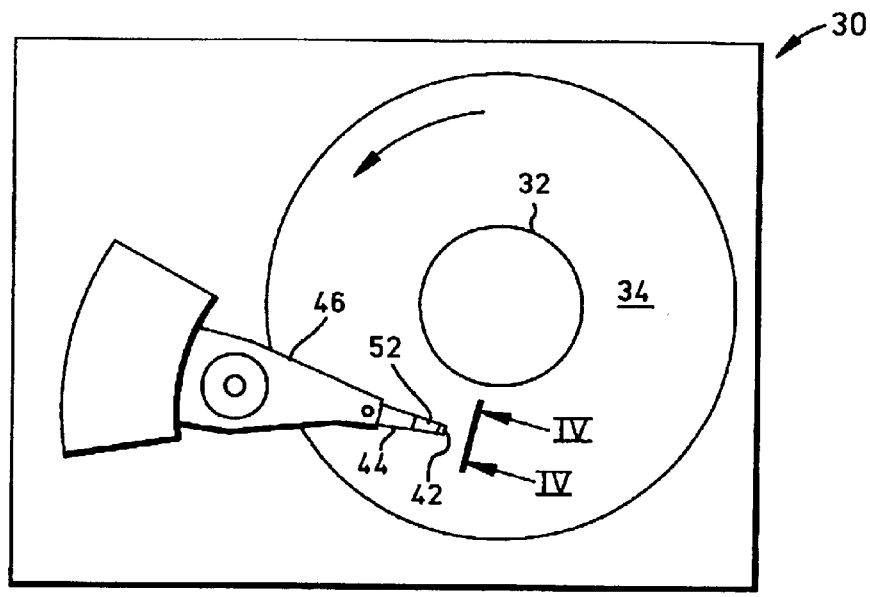
FIG. 3 is a planar view of an exemplary magnetic disk drive within which a magnetic head of the present invention may be embodied.
Figure 4:
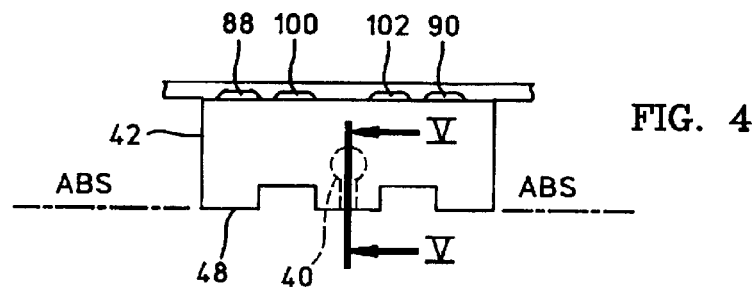
FIG. 4 is an end view of a slider with a magnetic head of the disk drive as seen in plane II—II of FIG. 3.
Figure 5:
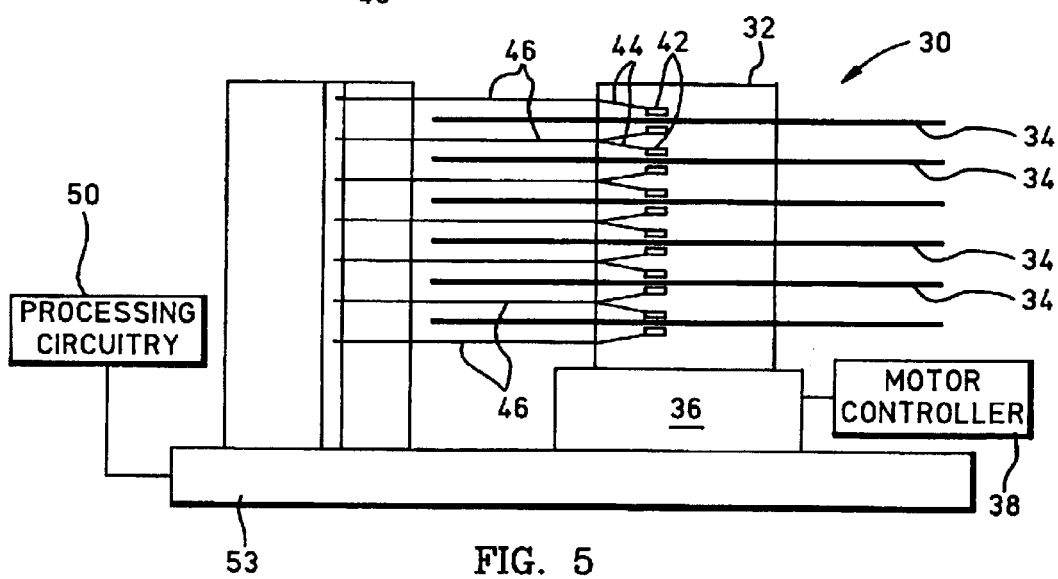
FIG. 5 is an elevation view of the magnetic disk drive wherein multiple disks and magnetic heads are employed.

Referring now to the drawings, wherein like reference numerals designate like or similar parts throughout the several views, there is illustrated in FIGS. 3–5 a magnetic disk drive 30. The drive 30 includes a spindle 32 that supports and rotates a magnetic disk 34. The spindle 32 is rotated by a motor 36 that, in turn, is controlled by a motor controller 38. A horizontal combined magnetic head 40 for reading and recording is mounted on a slider 42. The slider 42 is supported by a suspension 44 and actuator arm 46. A plurality of disks, sliders and suspensions may be employed in a large capacity direct access storage device (DASD), as shown in FIG. 5. The suspension 44 and actuator arm 46 position the slider 42 to locate the magnetic head 40 in a transducing relationship with a surface of the magnetic disk 34. When the disk 34 is rotated by the motor 36, the slider is supported on a thin (typically, 0.05 $\mu$M) cushion of air (air bearing) between the disk and an air bearing surface (ABS) 48.

Figure 6:
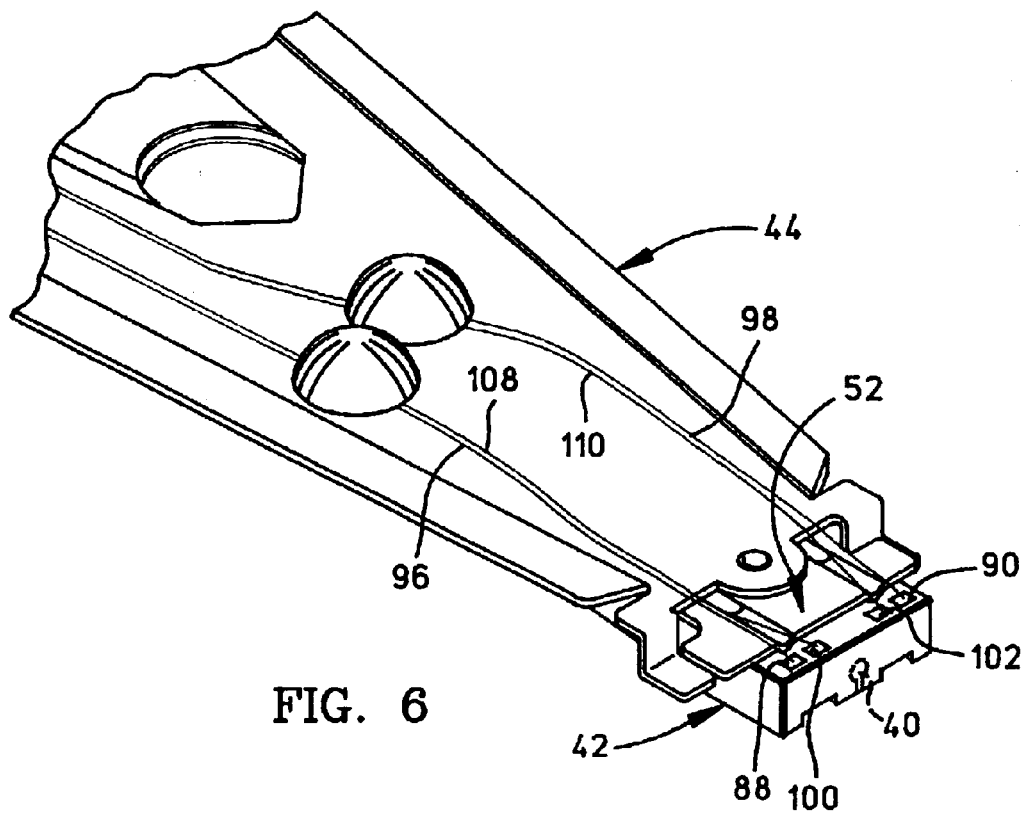
FIG. 6 is an isometric illustration of an exemplary suspension system for supporting the slider and magnetic head.
Figure 7:
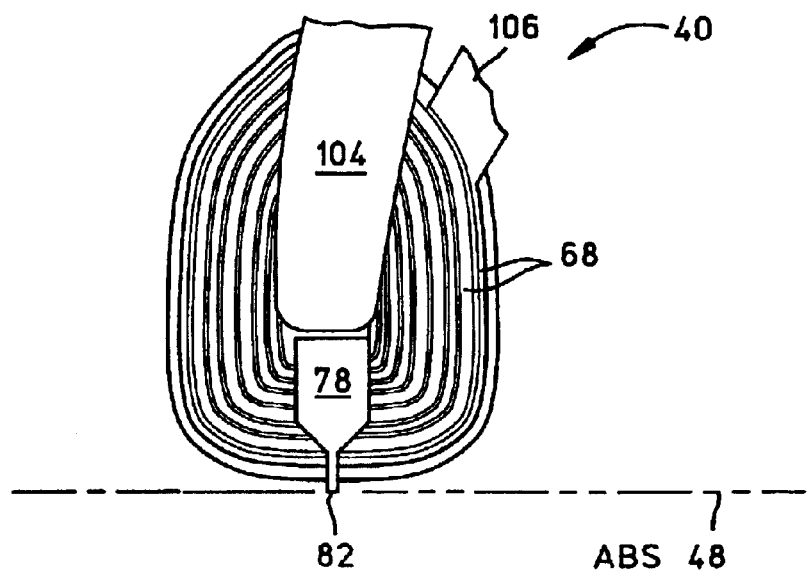
FIG. 7 is a top view of the second pole piece and coil layer, a portion of which is shown in FIG. 5, with all insulation material removed.

Magnetic head 40 may be employed for writing information to multiple circular tracks on the surface of the disk 34, as well as for reading information therefrom. Processing circuitry 50 exchanges signals representing such information with the head 40, provides motor drive signals, and also provides control signals for moving the slider 42 to various tracks. In FIGS. 3 and 6 the slider 42 is shown mounted to a head gimbal assembly (HGA) 52 that is mounted to the suspension 44. All of the above components are supported on a base 53.

Figure 8:
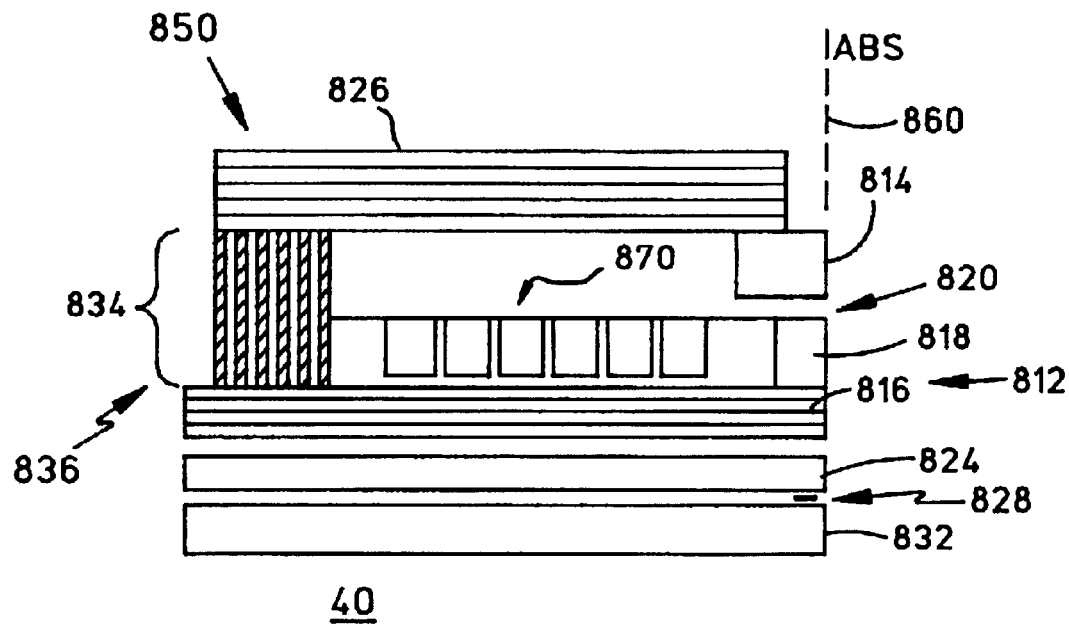
FIG. 8 is a cross-sectional view of the slider and magnetic head as seen in plane V—V of FIG. 4, showing the back gap structure being made of a vertically laminated structure of alternating layers of magnetic and non-magnetic materials (parallel with ABS)

FIG. 8 is a side cross-sectional elevation view of magnetic head 40 which is constructed in accordance with the present invention. A read head portion of magnetic head 40 includes a read sensor 828 which may be of the MR or GMR type. Read sensor 828 is sandwiched in between gap layers which are, in turn, sandwiched between first and second shield layers 824 and 832. In response to external magnetic fields, the resistance of read sensor 828 changes. A sense current conducted through the sensor causes these resistance changes to be manifested as potential changes, which are processed by the processing circuitry 50 shown in FIG. 5. A write head portion of magnetic head 40 includes write coils 870 sandwiched in between insulation layers, referred to as an insulation stack. Write coils 870 and the insulation layers are formed in between first, second, and third pole pieces 812, 814, and 826. A separation layer separates second shield layer 824 from a first pole piece 812.

First pole piece 812 is made of a first pole piece layer 816 and a first pole tip structure 818 which is formed on top of first pole piece layer 816 at the ABS 860. First pole piece layer 816 is a horizontally laminated structure having alternating layers of magnetic and non-magnetic materials, as indicated by the horizontal lines in the figure. On the other hand, first pole tip structure 818 and a second pole piece 814 are electroplated structures. The magnetic material in first and second pole pieces 812 and 814 may be any suitable magnetic material, preferably one having a high magnetic moment, such as Permalloy or various compositions of NiFe or CoFe alloys which may include other common additives or dopants to control its material properties. First and second pole pieces 812 and 814 have first and second pole tips that are separated by a non-magnetic gap layer 820 at the ABS 860. Gap layer 820 may be made of alumina ($Al_2O_3$) or other suitable non-magnetic material.

Third pole piece 826 is formed partially over second pole piece 814 near the ABS 860 and over a back gap structure 834 in the back gap region. Like first pole piece layer 816, third pole piece 826 is a horizontally laminated structure having alternating layers of magnetic and non-magnetic materials, as indicated by the horizontal lines within the structure. As illustrated, the planar layers in third pole piece 826 are perpendicular to ABS plane 860.

Figure 9:
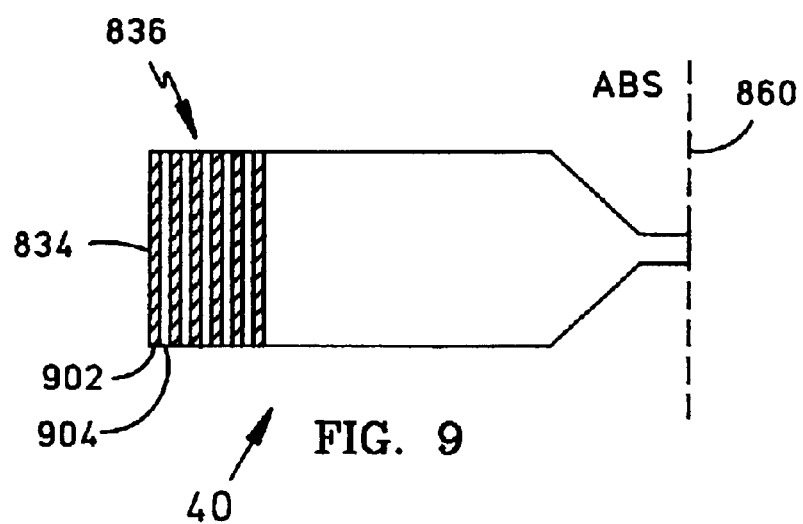
FIG. 9 is a top view of the magnetic head, which also shows the back gap structure being made of the vertically laminated structure (parallel with ABS)

Back gap structure 834 is formed between first and third pole pieces 816 and 826 in the back gap region to magnetically couple first, second, and third pole pieces 812, 814, and 826. Back gap structure 834 is a vertically laminated structure having alternating layers 836 of magnetic and non-magnetic materials. Each layer 836 in back gap structure 834 is substantially planar or rectangular in shape, and has side edges which extend to make contact with third pole piece 826 and first pole piece layer 816. Thus, each layer 836 is perpendicular to both first and third pole pieces 812 and 826. As shown in the top view of FIG. 9, each alternating layer 836 of back gap structure 834 is also parallel with the ABS plane 860. For example, a magnetic layer 902 and a non-magnetic layer 904 of back gap structure 834 shown in FIG. 9 are parallel with ABS plane 860. The plurality of magnetic layers 836 in back gap structure 834 may be referred to as a plurality of magnetic elements, which are interleaved or interspersed within non-magnetic materials.

The magnetic material in third pole piece 826 and back gap structure 834 may be any suitable magnetic material, preferably one having a high magnetic moment, such as Permalloy or various compositions of NiFe or CoFe alloys which may include other common additives or dopants to control its material properties. The non-magnetic material in third pole piece 826 may be any suitable non-magnetic or insulator material, such as alumina ($Al_2O_3$) or silicon dioxide ($SiO_2$). Back gap structure 834 may be made of the same kinds of insulator material, or may be a hard baked photoresist The laminated structures of first pole piece layer 816, third pole piece 826, and back gap structure 834 help reduce eddy currents at high operating frequencies (e.g., frequencies greater than 100 Megahertz). Since back gap structure 834 has layers that are oriented in a direction parallel with the magnetic flux, eddy currents in the back gap region are suppressed.

In the embodiment shown in FIGS. 8 and 9, back gap structure 834 is shown to have six (6) magnetic layers. However, any suitable number of layers or elements may be formed; for example, back gap structure 834 may have between about 5–10 magnetic layers or elements. Preferably, each layer in back gap structure 834 is made as thin as possible. More particularly, the thickness of each magnetic layer is at least less than the skin depth of the material so that eddy currents cannot be formed.

The "skin depth" is the thickness within which eddy currents are formed and is inversely proportional to the square root of the operating frequency. More specifically, the skin depth "δ" is equal to:

$$\delta = \frac{c}{(2\pi\omega\mu r)^{\frac{1}{2}}},$$

where c is the speed of light, ω is the cyclic operating frequency, μ is the magnetic permeability of the material, and r is the electrical conductivity of the material. At the present time, a typical nominal operating frequency for a magnetic head is about 400 MHz; thus for $Ni_{45}Fe_{55}$ the skin depth is approximately 0.5 μm and so the thickness of each layer is preferably at least less than 0.5 μm.

In the particular embodiment shown in FIGS. 8–9, first pole piece 812 is the lower pole piece of the write head and third pole piece 826 is the upper pole piece of the write head. However, lower and upper pole pieces may correspond to other suitably named structures of a write head depending on the particular design and naming convention used. For example, in a simplified two pole piece design having only first and second pole pieces, the lower pole piece may be referred to as the first pole piece (P1) and the upper pole piece may be referred to as the second pole piece (P2).

Figure 10:
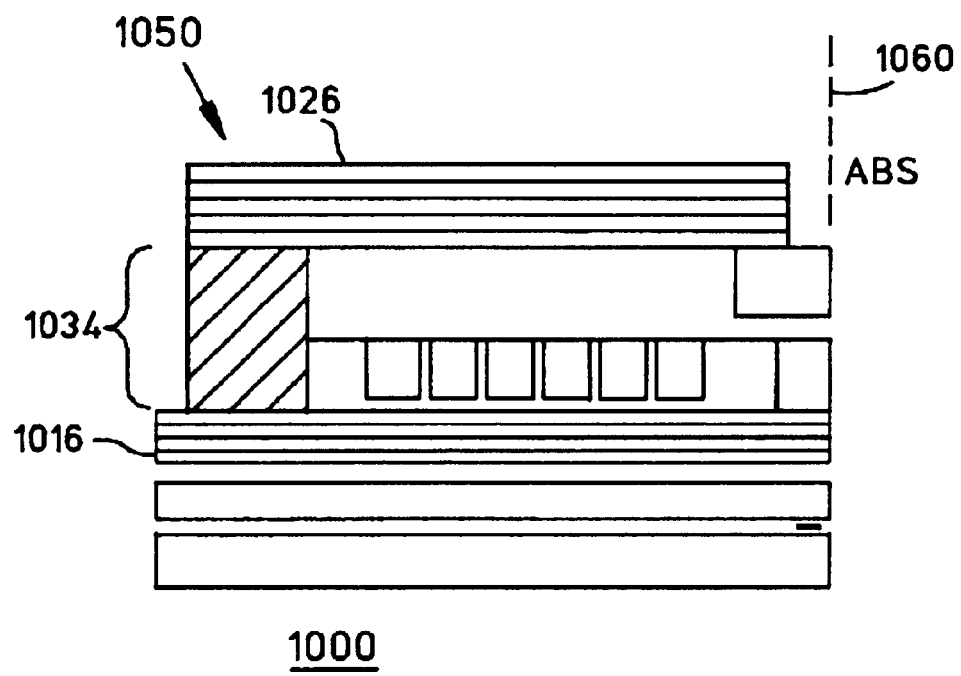
FIG. 10 is a cross-sectional view of the slider and magnetic head as seen in plane V—V of FIG. 4 in an alternate embodiment, showing the back gap structure being made of a vertically laminated structure of alternating layers of magnetic and non-magnetic materials (perpendicular with ABS)
Figure 11:
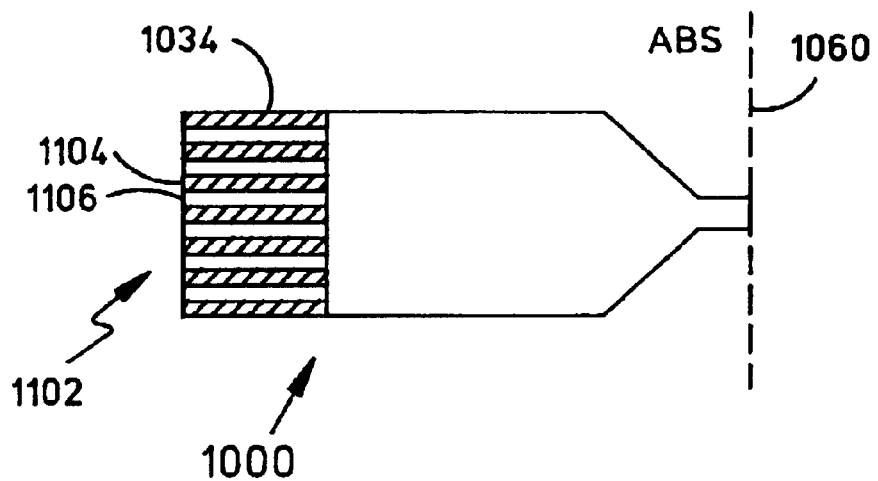
FIG. 11 is a top view of the magnetic head in the alternate embodiment of FIG. 10, also showing the back gap structure being made of the vertically laminated structure (perpendicular with ABS)

FIGS. 10 and 11 show a side cross-sectional elevation view and a top down view, respectively, of a magnetic head 1000 in an alternate embodiment. A magnetic portion 1050 of the write head includes a lower pole piece 1016, an upper pole piece 1026, and a back gap structure 1034 which connects lower and upper pole pieces 1016 and 1026. Magnetic head 1000 of FIGS. 10 and 11 is the same as that shown and described in relation to FIGS. 8–9, except that back gap structure 1034 is a vertically laminated structure having alternating layers 1102 of magnetic and non-magnetic materials that are perpendicular to the ABS plane 1060. For example, see a magnetic layer 1104 and a non-magnetic layer 1106 of back gap structure 1034 in FIG. 11. Each layer 1102 still remains perpendicular to both lower and upper pole pieces 1016 and 1026, having side edges which extend to make contact with lower and upper pole pieces 1016 and 1026. In the embodiment shown in FIGS. 10–11, back gap structure 1034 is shown to have seven (7) magnetic layers 1102 for simplicity, but any suitable number of layers or elements may be included. For example, back gap structure 1034 may have between about 20–30 magnetic layers 1102 or elements.

Figure 12:
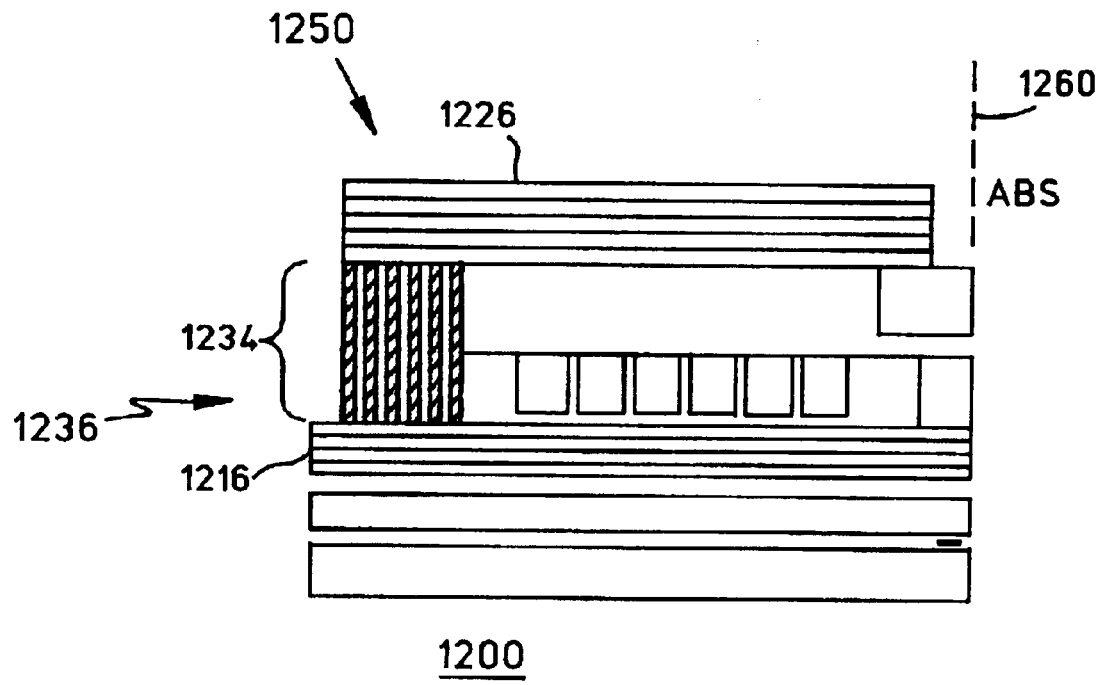
FIG. 12 is a cross-sectional view of the slider and magnetic head as seen in plane V—V of FIG. 4 in another alternate embodiment, showing the back gap structure having vertical magnetic columns (parallel with ABS) disposed within a non-magnetic material.
Figure 13:
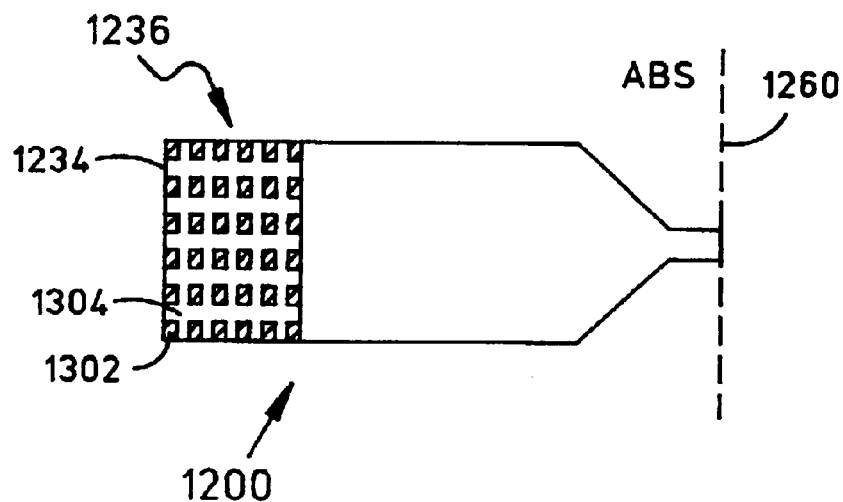
FIG. 13 is a top view of the magnetic head in the alternate embodiment of FIG. 12, also showing the back gap structure having the vertical magnetic columns (parallel with ABS) disposed within the non-magnetic material.

FIGS. 12 and 13 show a side cross-sectional elevation view and a top down view, respectively, of a magnetic head 1200 in another alternate embodiment A magnetic portion 1250 of the write head includes a lower pole piece 1216, an upper pole piece 1226, and a back gap structure 1234 which connects lower and upper pole pieces 1216 and 1226. Magnetic head 1200 of FIGS. 12 and 13 is the same as that shown and described in relation to FIGS. 8–9, except that back gap structure 1234 is a structure having a plurality of magnetic columns 1236 (e.g. a magnetic column 1302) interspersed within a non-magnetic material (e.g. a non-magnetic material 1304). Magnetic columns 1236 stand parallel to ABS plane 1260 but perpendicular to both lower and upper pole pieces 1216 and 1226. Magnetic columns 1236 have ends which extend to make contact with lower and upper pole pieces 1216 and 1226. The plurality of magnetic columns in back gap structure 1234 may be referred to as a plurality of magnetic elements which are interspersed within the non-magnetic materials. The laminated structures of lower pole piece 1216, upper pole piece 1226, and back gap structure 1234 help reduce eddy currents at high frequency operation (e.g., frequencies greater than 100 MHz). Since back gap structure 1234 has magnetic columns that are oriented in a direction parallel with the magnetic flux, the eddy currents in the back gap region are suppressed.

Three embodiments have been shown and described in relation to FIGS. 8–9, FIGS. 10–11, and FIGS. 12–13, but other variations are possible. Selection of the appropriate embodiment of FIGS. 8–9, 10–11, and 12–13 should be based on the properties of the chosen materials, its shape and anisotropy, and its edge stress and anisotropy. By changing the shape of the back gap laminated structures, both the direction and the magnitude of the magnetic anisotropy $H_K$ can be controlled. Since for a given saturation moment $B_S$ the magnetic permeability is $\mu = B_S/H_K$, the skin depth $\delta$ can be tuned based on the previously described equation for $\delta$.

In the embodiments of FIGS. 10–11 and 12–13, the lower pole piece may be referred to as the first pole piece (P1) and the upper pole piece may be referred to as the third pole piece (P3). However, as mentioned earlier, lower and upper pole pieces may correspond to other suitably named structures of a write head depending on the particular design and naming convention used. In a simplified two pole piece design, for example, the lower pole piece may be referred to as the first pole piece (P1) and the upper pole piece may be referred to as the second pole piece (P2).

Figure 14:
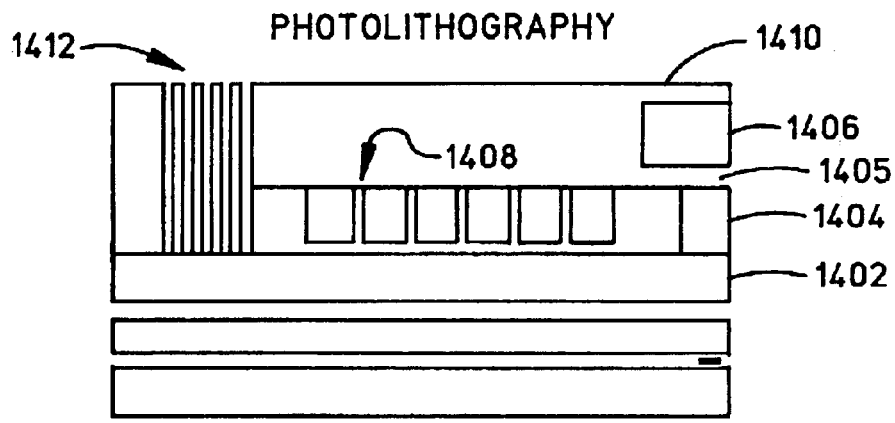
FIGS. 14–16 are cross-sectional views of partially constructed magnetic heads for describing a method of making a magnetic head having a vertically laminated back gap structure.
Figure 15:
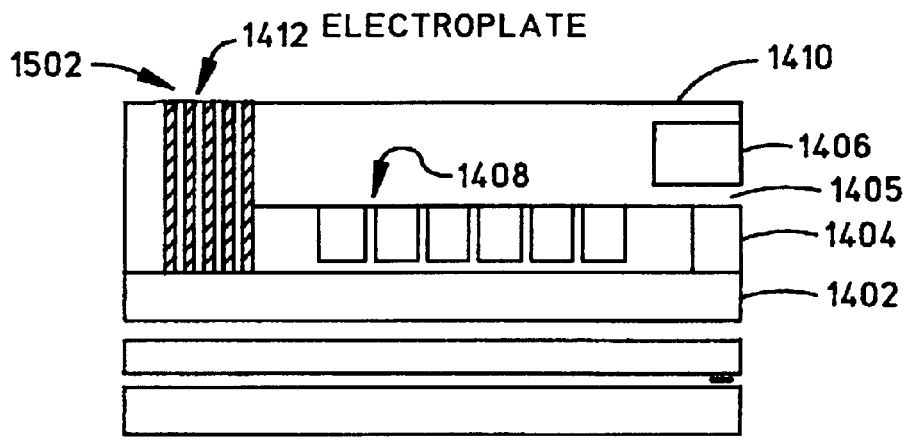
Figure 16:
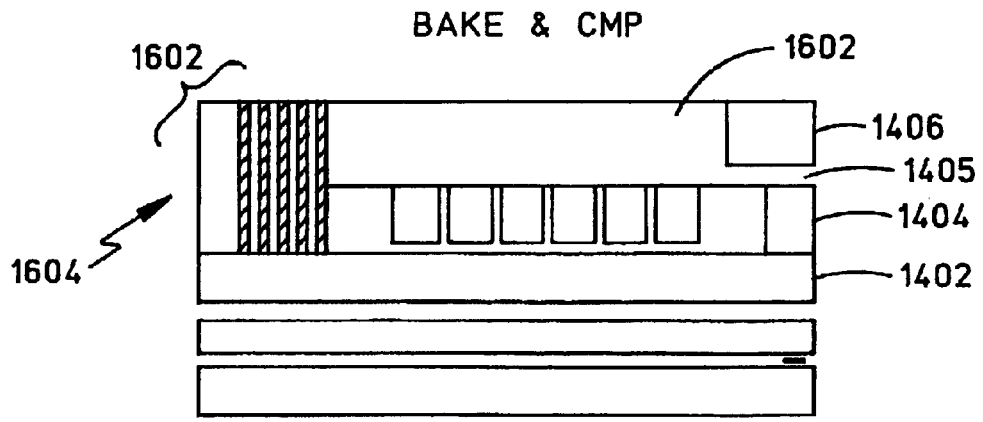
Figure 17:
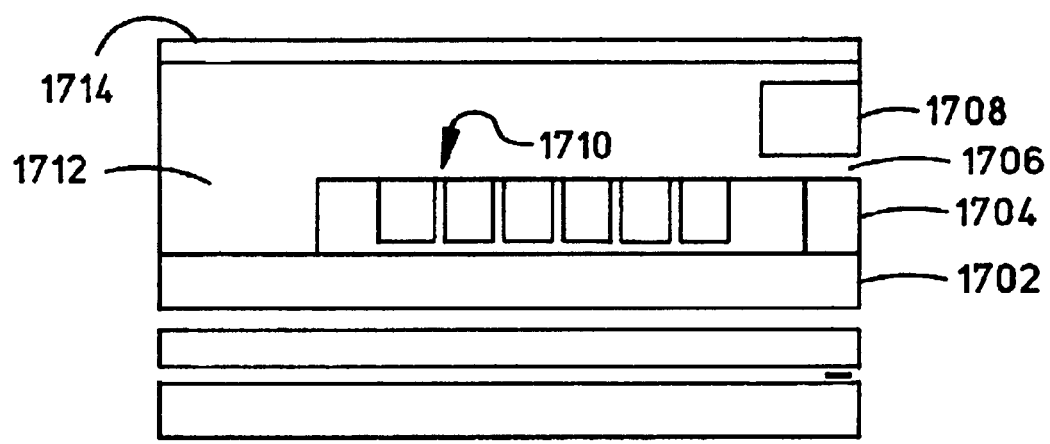
FIGS. 17–21 are cross-sectional views of partially constructed magnetic heads for describing another method of making a magnetic head having a vertically laminated back gap structure.

FIGS. 14–16 are cross-sectional views of partially constructed magnetic heads which help describe a method of making a magnetic head having a vertically laminated back gap structure. This method utilizes well-understood photolithography techniques to help form the back gap structure. Beginning with FIG. 14, a first pole piece layer 1402, a first pole tip structure 1404, a write coil layer 1408, a gap layer 1405, and a second pole piece 1406 are formed as is conventional. First pole piece layer 1402 may be a horizontally laminated structure, as previously described. A non-magnetic material, such as photoresist, is deposited over the structure and is patterned to create a patterned photoresist 1410. As illustrated, patterned photoresist 1410 is formed to have a plurality of non-magnetic layers 1412 in the back gap region which are substantially planar in shape. A planar hollow cavity exists between each non-magnetic layer 1412.

In FIG. 15, it is shown that a plurality of magnetic layers 1502 are then electroplated within the planar hollow cavities that existed between the plurality of non-magnetic layers 1412. The magnetic material that is plated may be any suitable magnetic material, preferably one having a high magnetic moment, such as Permalloy or various compositions of NiFe or CoFe alloys which may include other common additives or dopants to control its material properties. The thickness of each magnetic layer is formed to be at least less than the skin depth of the material, which is a function of the desired operating frequency.

In FIG. 16, the patterned photoresist is baked and the top surface of the structure is then mechanically or chemically-mechanically polished (CMP). Although CMP is preferred, any other suitable planarization process may be utilized. The photoresist is thereby turned into a hard bake resist 1602 which has a top surface that is substantially flush with the top of second pole piece 1406 and the top of the resulting back gap structure 1602. As shown, back gap structure 1602 is a vertically laminated structure having alternating layers of magnetic and non-magnetic materials. Additional steps, conventional or otherwise, which include forming an additional write coil layer and forming a third pole piece (a horizontally laminated structure having alternating layers of magnetic and non-magnetic materials), will complete the formation of the magnetic head. The resulting structure may be that shown and described in relation to FIGS. 8–9, FIGS. 10–11, FIGS. 12–13, or other suitable variations thereof.

FIGS. 17–21 are cross-sectional views of partially constructed magnetic heads which help describe another method of making a magnetic head having a vertically laminated back gap structure. This method utilizes well-understood reactive ion etching (RIE) and image transfer processes to help form the back gap structure. Beginning with FIG. 17, a first pole piece layer 1702, a write coil layer 1710, a first plated pedestal 1704, and a gap layer 1706 are formed as is conventional. First pole piece layer 1702 may be a horizontally laminated structure, as previously described. A suitable non-magnetic material, such as alumina ($Al_2O_3$) or silicon-dioxide ($SiO_2$) 1712, is then deposited over the structure. Second pole piece 1708 is then electroplated over gap layer 1706 at the ABS. Next, additional silicon-dioxide 1712 is deposited over the structure followed by another CMP over its top surface. A hardmask layer 1714 is then deposited over the top surface of the resulting structure. Hardmask layer 1714 may be any suitable material, such as alumina ($Al_2O_3$) or nickel-containing metal (e.g. NiFe) with a thickness of between about 500–10000 Angstroms.

Figure 18:
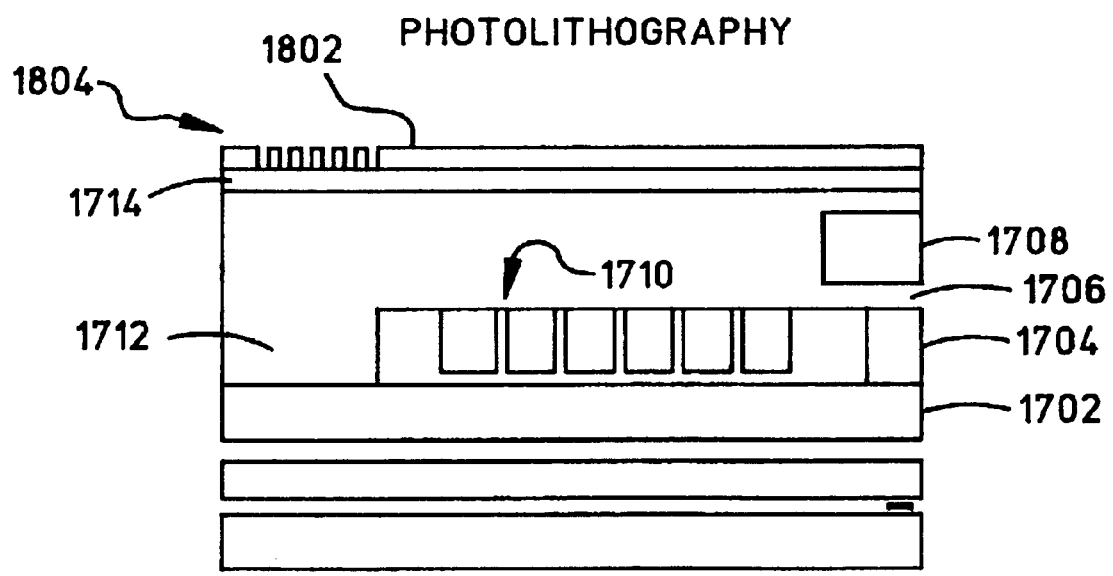
Figure 19:
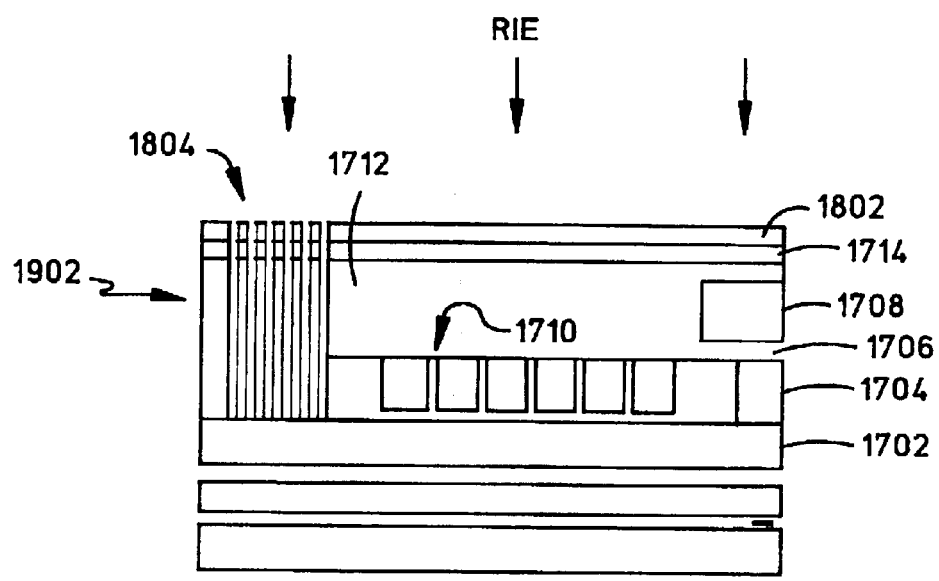

In FIG. 18 a non-magnetic material, such as photoresist, is deposited over hardmask layer 1714 and is patterned to create a patterned photoresist material 1802. Patterned photoresist material 1802 is formed with a plurality of recesses 1804 in the back gap region which expose top surface portions of hardmask layer 1714. Following photoresist exposure and development, the exposed surface of the hardmask is removed by ion milling or chemical etching. Then, in FIG. 19, a reactive ion etch (RIE) is performed to remove those portions of silicon-dioxide 1712 that are exposed through photoresist recesses 1804. The RIE is performed until top surface portions of first pole piece layer 1702 are exposed, and a plurality of vertically oriented non-magnetic layers 1902 are formed. A planar hollow cavity exists between each non-magnetic layer 1902. The RIE may utilize any suitable etch gas, such as $CF_4$ or $C_2F_6$.

Figure 20:
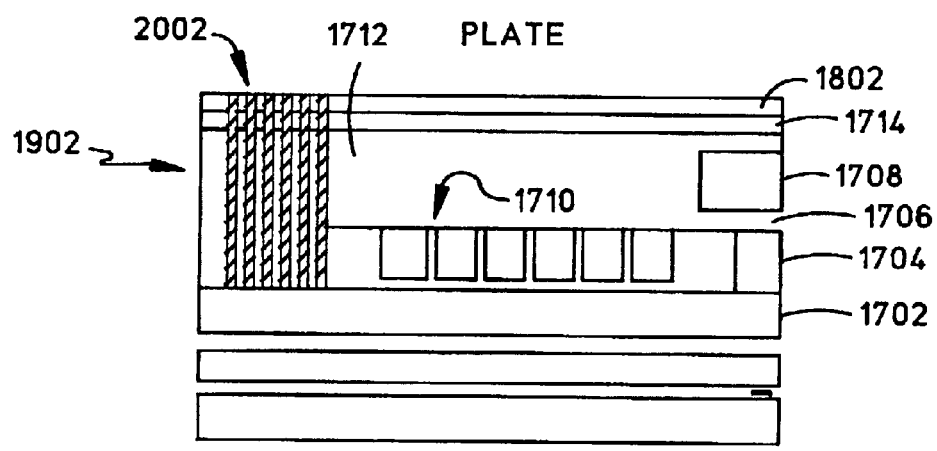
Figure 21:
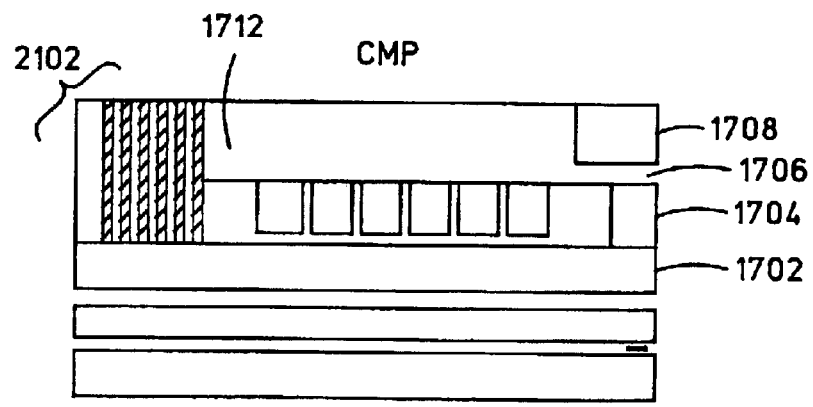
Figure 22:
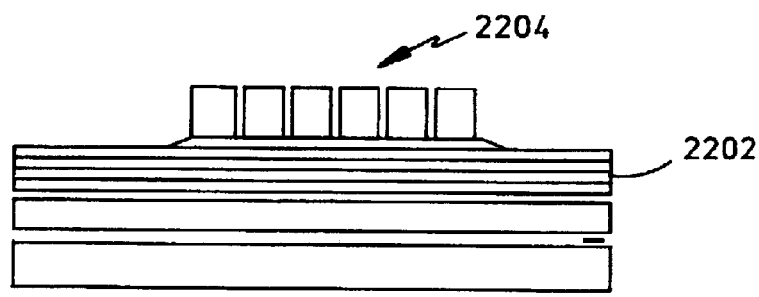
FIGS. 22–26 are cross-sectional views of partially constructed magnetic heads for describing yet another method of making a magnetic head having a vertically laminated back gap structure.

In FIG. 20, a plurality of magnetic layers 2002 are electroplated within the planar hollow cavities which exist between non-magnetic layers 1902. The magnetic layers that are electroplated may be made of any suitable magnetic material, preferably one having a high magnetic moment, such as Permalloy or various compositions of NiFe or CoFe alloys which may include other common additives or dopants to control its material properties. The thickness of each magnetic layer is formed to be at least less than the skin depth of the material, which is a function of the desired operating frequency. In FIG. 21, a chemical mechanical polishing (CMP) is performed on the top surface to remove the remaining photoresist and hardmask material as well as top portions of the magnetic and non-magnetic materials. A substantially planar top surface is thereby formed over the structure.

As shown in FIG. 21, the resulting back gap 2102 is a vertically laminated structure having alternating layers of magnetic and non-magnetic materials. Additional steps, conventional or otherwise, which include forming an additional write coil layer and forming a third pole piece (a horizontally laminated structure having alternating layers of magnetic and non-magnetic materials), will complete the formation of the magnetic head. The resulting structure may be that shown and described in relation to FIGS. 8–9, FIGS. 10–11, FIGS. 12–13, or other suitable variations thereof.

FIGS. 22–26 are cross-sectional views of partially constructed magnetic heads which help describe yet another method of making a magnetic head having a vertically laminated back gap structure. This simplified method utilizes well-understood photolithography techniques to help form this structure. Beginning with FIG. 22, a first pole piece layer 2202 and a write coil layer 2204 are formed as is conventional. First pole piece layer 2202 may be a horizontally laminated structure, as previously described.

Figure 23:
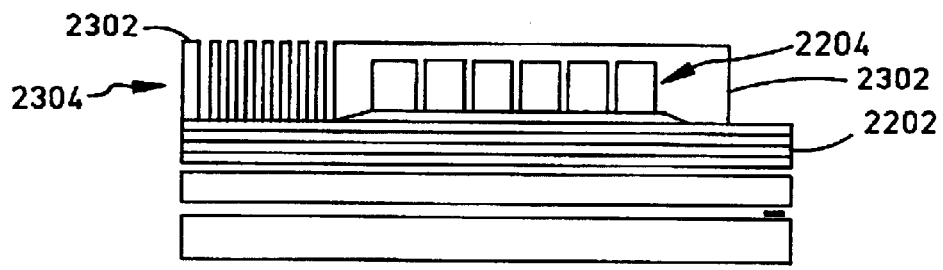

In FIG. 23, a non-magnetic material, such as photoresist, is deposited over the structure and is patterned to create a patterned photoresist 2302. As illustrated, patterned photoresist 2302 is formed to have a plurality of vertically-oriented non-magnetic layers 2304 in the back gap region which are substantially planar in shape. A planar cavity exists between each such non-magnetic layer 2304. As illustrated, patterned photoresist 2302 is also offset from the ABS such that no photoresist exists over first pole piece layer 2202 at the ABS.

Figure 24:
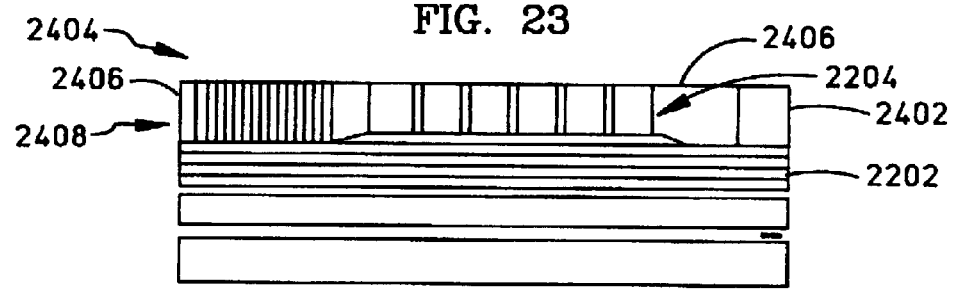

In FIG. 24, it is shown that a first P1 pedestal 2402 is electroplated on first pole piece layer 2202 at the ABS. Simultaneously with first P1 pedestal 2402, a plurality of vertically-oriented magnetic layers 2404 are electroplated within the planar cavities that existed between the plurality of non-magnetic layers. The magnetic material that is plated may be any suitable magnetic material, preferably one having a high magnetic moment, such as Permalloy or various compositions of NiFe or CoFe alloys which may include other common additives or dopants to control its material properties. The thickness of each magnetic layer 2404 is formed to be at least less than the skin depth of the material, which is a function of the desired operating frequency.

The patterned photoresist is then dissolved using a suitable solvent and an insulator 2406 is deposited over the structure. Insulator 2406, which is preferably a photoresist, is formed in between write coils 2204, in between P1 pedestal 2402 and write coils 2204, and in between the plated magnetic layers to form a new plurality of non-magnetic layers 2408 in the back gap region. If photoresist is used, it is subsequently hard-baked. The top surface of the structure is then planarized using mechanical or chemical-mechanical polishing (CMP) techniques. Thus, insulator 2406 (e.g. a hard bake resist) is formed with a top surface that is substantially flush with the top of write coils 2204 and the top of the P1 pedestal 2402. A lower portion of the back gap structure is thereby formed.

Figure 25:
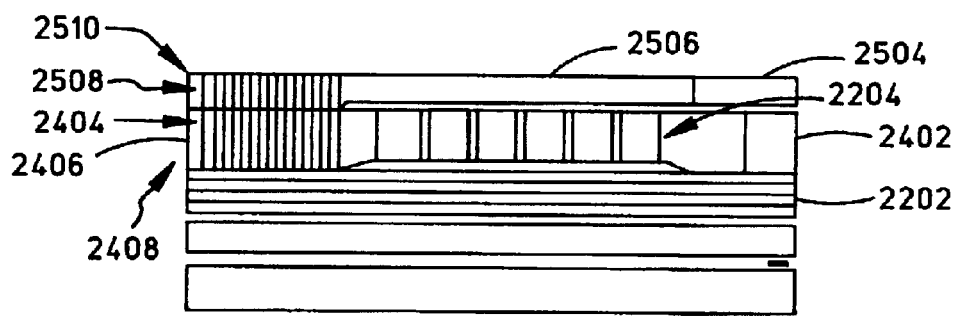
Figure 26:
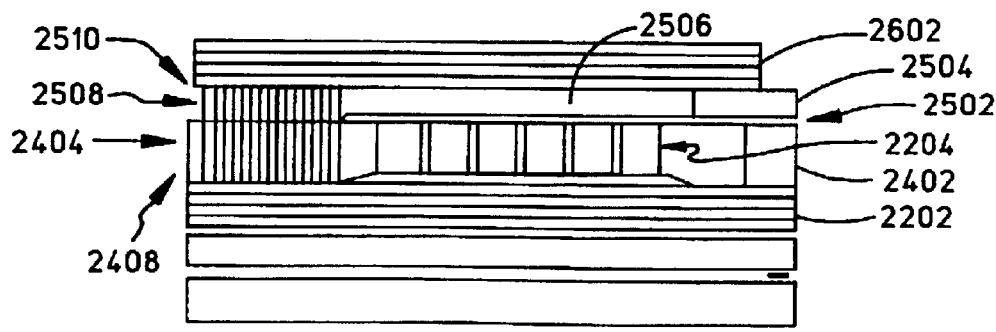

Next, gap layer materials are sputter deposited over the structure and etched away in the back gap region to form, as shown in FIG. 25, a gap layer 2502 over P1 pedestal 2402 and write coils 2204. Gap layer 2502 may be any suitable insulating material, such as alumina ($Al_2O_3$). Next, the previous techniques used to form magnetic and non-magnetic layers 2404 and 2408 in the back region (photolithography, electroplating, and CMP) are again used to form an upper portion of the back gap structure which includes magnetic and non-magnetic layers 2508 and 2510. As illustrated, magnetic layers 2508 are formed over and aligned with magnetic layers 2404, and non-magnetic layers 2510 are formed over and aligned with non-magnetic layers 2404. A non-magnetic insulator material 2506 is used in the formation of this structure and the non-magnetic layers 2510. A P2 pole 2504 of the second pole piece is formed (via electroplating) over gap layer 2502 at the ABS simultaneously with magnetic layers 2408 in the same step.

Advantageously, the back gap is formed as a vertically laminated structure having alternating layers of magnetic and non-magnetic materials. Additional steps, conventional or otherwise, which include forming a third pole piece 2602 in FIG. 26 (a horizontally laminated structure having alternating layers of magnetic and non-magnetic materials), will complete the formation of the magnetic head. The resulting structure may be that shown and described in relation to FIGS. 8–9, FIGS. 10–11, FIGS. 12–13, or other suitable variations thereof.

Thus, a magnetic write head having a vertically laminated back gap structure and methods of making the same have been described. The magnetic head has lower and upper pole pieces and a back gap structure which connects the lower and the upper pole pieces in a back gap region. In one illustrative embodiment, the back gap is a vertically laminated structure having alternating layers of magnetic and non-magnetic materials. Each layer is perpendicular to both the lower and the upper pole pieces, and may be either perpendicular or parallel to the ABS plane. Advantageously, the vertically laminated structure reduces eddy currents in the back gap region at high operating frequencies. Alternatively, the back gap structure may be formed with magnetic columns interspersed within non-magnetic materials, where each column is perpendicular to both the lower and the upper pole pieces.

Methods for making such a magnetic head have also been described. One method involves forming lower and upper pole pieces and a back gap structure which connects the lower and the upper pole pieces in a back gap region. The back gap is formed as a vertically laminated structure having alternating layers of magnetic and non-magnetic materials. Each layer is perpendicular to both the lower and the upper pole pieces, and may be either perpendicular or parallel to the ABS plane. Alternatively, the back gap portion is formed with magnetic columns interspersed within non-magnetic materials, where each column is perpendicular to both the lower and the upper pole pieces.

It is to be understood that the above is merely a description of preferred embodiments of the invention and that various changes, alterations, and variations may be made without departing from the true spirit and scope of the invention as set for in the appended claims. For example, although first and third pole pieces (P1 & P3) have been shown and described in many cases to be the lower and upper pole pieces, respectively, the lower and the upper pole pieces of the write heads may alternatively be and be referred to as the first and second pole pieces (P1 & P2), respectively. None of the terms or phrases in the specification and claims has been given any special particular meaning different from the plain language meaning to those skilled in the art, and therefore the specification is not to be used to define terms in an unduly narrow sense.

What is claimed is:

1. A magnetic head, comprising:
    a lower pole piece;
    an upper pole piece;
    a back gap structure which connects the lower and the upper pole pieces in a back gap region;
    the back gap structure having a plurality of magnetic elements interspersed with non-magnetic materials;
    each magnetic element extending between and connecting with the lower and the upper pole pieces;
    the magnetic head being operative at a nominal operating frequency greater than 100 Megahertz (MHz); and
    each magnetic element having a thickness that is less than a skin depth of the magnetic element at the nominal operating frequency.

2. The magnetic head of claim 1, further comprising:
    wherein the plurality of magnetic elements interspersed within the non-magnetic materials reduce eddy currents in the back gap region.

3. The magnetic head of claim 1, further comprising:
wherein the magnetic elements and the non-magnetic materials comprise alternating layers of magnetic and non-magnetic materials.

4. The magnetic head of claim 1, further comprising:
wherein the magnetic elements and the non-magnetic materials comprise alternating layers of magnetic and non-magnetic materials; and
wherein each alternating layer of magnetic and non-magnetic materials is parallel with the ABS.

5. The magnetic head of claim 1, further comprising:
wherein the magnetic elements and the non-magnetic materials comprise alternating layers of magnetic and non-magnetic materials; and
wherein each alternating layer of magnetic and non-magnetic materials is perpendicular to the ABS.

6. The magnetic head of claim 1, further comprising:
wherein the magnetic elements comprise magnetic columns interspersed within the non-magnetic materials.

7. The magnetic head of claim 1, further comprising:
wherein the lower pole piece comprises a first pole piece (P1);
a second pole piece (P2) formed underneath the upper pole piece at an air bearing surface (ABS);
a gap layer formed between the first and the second pole pieces (P1 & P2) at the ABS; and
wherein the upper pole piece comprises a third pole piece (P3).

8. The magnetic head of claim 1, further comprising:
wherein the lower pole piece comprises a first pole piece;
wherein the upper pole piece comprises a second pole piece; and
a gap layer formed between the first and the second pole pieces at an air bearing surface (ABS).

9. A disk drive, comprising:
at least one rotatable magnetic disk;
a spindle supporting the at least one rotatable magnetic disk;
a disk drive motor for rotating the at least one rotatable magnetic disk;
a magnetic head for writing data to the at least one rotatable magnetic disk;
a slider for supporting the magnetic head;
the magnetic head including:
 a lower pole piece;
 an upper pole piece;
 a back gap structure which connects the lower and the upper pole pieces in a back gap region;
 the back gap structure having a plurality of magnetic elements interspersed with non-magnetic materials;
 each magnetic element extending between and connecting with the lower and the upper pole pieces;
 the magnetic head being operative at a nominal operating frequency greater than 100 Megahertz (MHz); and
 each magnetic element having a thickness that is less than a skin depth of the magnetic element at the nominal operating frequency.

10. The disk drive of claim 9, further comprising:
wherein the lower pole piece comprises a first pole piece (P1);
a second pole piece (P2) formed underneath the upper pole piece at an air bearing surface (ABS);
a gap layer formed between the first and the second pole pieces (P1 & P2) at the ABS; and
wherein the upper pole piece comprises a third pole piece (P3).

11. The disk drive of claim 9, further comprising:
wherein the plurality of magnetic elements interspersed within the non-magnetic materials reduce eddy currents in the back gap region.

12. The disk drive of claim 9, further comprising:
wherein the magnetic elements and the non-magnetic materials comprise alternating layers of magnetic and non-magnetic materials.

13. The disk drive of claim 9, further comprising:
wherein the magnetic elements and the non-magnetic materials comprise alternating layers of magnetic and non-magnetic materials
wherein each alternating layer is parallel with the ABS.

14. The disk drive of claim 9, further comprising:
wherein the magnetic elements and the non-magnetic materials comprise alternating layers of magnetic and non-magnetic materials
wherein each alternating layer is perpendicular to the ABS.

15. The disk drive of claim 9, further comprising:
wherein the magnetic elements comprise magnetic columns interspersed within the non-magnetic materials.

16. The disk drive of claim 9, further comprising:
wherein the lower pole piece comprises a first pole piece;
wherein the upper pole piece comprises a second-pole piece; and
a gap layer formed between the first and the second pole pieces at an air bearing surface (ABS).

17. A magnetic head, comprising:
a lower pole piece;
an upper pole piece;
a back gap structure which connects the lower and the upper pole pieces in a back gap region;
the back, gap structure being a vertically laminated structure having alternating layers of magnetic and non-magnetic materials;
each alternating layer of magnetic and non-magnetic materials extending between and connecting with the upper and the lower pole pieces; and
each alternating layer being perpendicular to an air bearing surface (ABS) of the magnetic head.

18. The magnetic head of claim 17, further comprising:
wherein the upper pole piece comprises a horizontally laminated structure having alternating layers of magnetic and non-magnetic materials.

19. The magnetic head of claim 17, further comprising:
wherein the lower pole piece comprises a first pole piece;
wherein the upper pole piece comprises a second pole piece; and
a gap layer formed between the first and the second pole pieces at an air bearing surface (ABS).

20. The magnetic head of claim 17, further comprising:
wherein the vertically laminated structure reduces eddy currents in the back gap region.

21. The magnetic head of claim 17, further comprising:
wherein the lower pole piece comprises a first pole piece (P1);
a second pole piece (P2) formed underneath the upper pole piece at an air bearing surface (ABS);
a gap layer formed between the first and the second pole pieces (P1 & P2) at the ABS; and
wherein the upper pole piece comprises a third pole piece (P3).

22. The magnetic head of claim 17, further comprising:
the magnetic head being operative at a nominal operating frequency greater than 100 Megahertz (MHz): and
each magnetic layer having a thickness that is less than a skin depth of the magnetic layer at the nominal operating frequency.

23. The magnetic head of claim 17, further comprising:
wherein the lower pole piece comprises a horizontally laminated structure having alternating layers of magnetic and non-magnetic materials.

24. A method of making a magnetic head having a nominal operating frequency greater than 100 Megahertz (MHz), comprising:
forming a lower pole piece;
forming a back gap structure over the lower pole piece in a back gap region, the back gap structure having a plurality of magnetic elements interspersed within non-magnetic materials;
forming an upper pole piece over the back gap structure;
each magnetic element extending between and connecting with the lower and the upper pole pieces; and
each magnetic element having a thickness that is less than a skin depth of the magnetic element at the nominal operating frequency.

25. The method of claim 24, further comprising:
wherein the act of forming the lower pole piece comprises forming a first pole piece (P1) which includes a first pole piece layer;
forming write coils over but insulated from the first pole piece layer;
forming a lower portion of the back gap structure by:
depositing photoresist materials in the back gap region;
patterning a plurality of hollow cavities within the photoresist materials in the back gap region;
plating the plurality of magnetic elements within the hollow cavities;
performing a planarization process over a top surface of the resulting structure;
forming a P1 pedestal over the first pole piece layer at an air bearing surface (ABS);
forming a gap layer over the P1 pedestal at the ABS;
forming an upper portion of the back gap structure by repeating the acts of depositing, patterning, plating, and performing a planarization process;
forming a second pole piece (P2) over the gap layer at the ABS; and
wherein the act of forming the upper pole piece comprises forming a third pole piece (P3) over the back gap structure and the second pole piece.

26. The method of claim 25, wherein the act of plating the plurality of magnetic elements to form the lower portion of the back gap structure is used to simultaneously form the P1 pedestal.

27. The method of claim 25, wherein the repeated act of plating the plurality of magnetic elements to form the upper portion of the back gap structure is used to simultaneously form the second pole piece (P2).

28. The method of claim 24, wherein the act of forming the back gap structure comprises the further act of forming the plurality of magnetic elements and the non-magnetic materials as alternating layers of magnetic and non-magnetic materials.

29. The method of claim 24, wherein the act of forming the back gap structure comprises the further act of forming the plurality of magnetic elements and the non-magnetic materials as alternating layers of magnetic and non-magnetic materials, such that each alternating layer is parallel with the ABS.

30. The method of claim 24, wherein the act of forming the back gap structure comprises the further act of forming the plurality of magnetic elements and the non-magnetic materials as alternating layers of magnetic and non-magnetic materials, such that each alternating layer is perpendicular to the ABS.

31. The method of claim 24, wherein the act of forming the back gap structure comprises the further act of forming the plurality of magnetic elements as magnetic columns.

32. The method of claim 24, further comprising:
wherein the act of forming the lower pole piece comprises forming a first pole piece;
wherein the act of forming the upper pole piece comprises forming a second pole piece; and
forming a gap layer between the first and the second pole pieces at an air bearing surface (ABS).

33. The method of claim 24, further comprising: wherein the act of forming the lower pole piece comprises forming a first pole piece (P1);
forming a gap layer over the first pole piece (P1) at an air bearing surface (ABS);
forming a second pole piece (P2) over the gap layer at the ABS; and
wherein the act of forming the upper pole piece comprises forming a third pole piece (P3) formed over the back gap structure and the second pole piece (P2).

34. The method of claim 24, wherein the act of forming the back gap structure comprises the further acts of:
depositing photoresist materials over the lower pole piece in the back gap region;
patterning a plurality of hollow cavities within the photoresist materials in the back gap region;
plating the plurality of magnetic elements within the hollow cavities; and
performing a planarization process over a top surface of the resulting structure.

35. The method of claim 24, wherein the act of forming the back gap structure comprises the further acts of:
forming a lower portion of the back gap structure by:
depositing photoresist materials in the back gap region;
patterning a plurality of hollow cavities within the photoresist materials in the back gap region;
plating the plurality of magnetic elements within the hollow cavities;
performing a planarization process over a top surface of the resulting structure, to thereby form a lower portion of the back gap structure;
forming a gap layer at an air bearing surface (ABS); and
forming an upper portion of the back gap structure by repeating the acts of depositing, patterning, plating, and performing a planarization process.

36. The method of claim 24, further comprising:
depositing non-magnetic materials over the lower pole piece in the back gap region;
depositing a hardmask layer over the non-magnetic materials;
depositing photoresist materials over the hardmask layer and patterning a plurality of hollow cavities within the photoresist materials in the back gap region;
performing a reactive ion etch (RIE) to remove those portions of non-magnetic materials underneath the hollow cavities;
plating the plurality of magnetic elements within the hollow cavities; and
performing a planarization process over a top surface of the resulting structure.

* * * * *